(12) United States Patent
 Choudhary (10) Patent No.: US 9,424,416 B1
(45) Date of Patent: Aug. 23, 2016

(54) ACCESSING APPLICATIONS FROM SECURED STATES

(71) Applicant: Amazon Technologies, Inc., Reno, NV (US)

(72) Inventor: Mihir Kumar Choudhary, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 36 days.

(21) Appl. No.: 13/934,121

(22) Filed: Jul. 2, 2013

(51) Int. Cl.
 *G06F 21/44* (2013.01)
 *G06F 3/041* (2006.01)
 *G06F 3/048* (2013.01)

(52) U.S. Cl.
 CPC ............... *G06F 21/44* (2013.01); *G06F 3/041* (2013.01); *G06F 3/048* (2013.01)

(58) Field of Classification Search
 USPC .......................................................... 726/19
 See application file for complete search history.

(56) References Cited

U.S. PATENT DOCUMENTS

| 2012/0084734 | A1* | 4/2012 | Wilairat | ........................ 715/863 |
| 2012/0276871 | A1* | 11/2012 | Tanioka | .................. G06F 21/36 455/411 |
| 2012/0311499 | A1* | 12/2012 | Dellinger | ........... H04N 5/23206 715/835 |
| 2013/0145453 | A1* | 6/2013 | Lemke | ........................... 726/16 |

* cited by examiner

*Primary Examiner* — Jeffrey Pwu
*Assistant Examiner* — Samuel Ambaye
(74) *Attorney, Agent, or Firm* — Polsinelli LLP

(57) ABSTRACT

A computing device can enable a user to navigate to an application or other digital object directly from a lock screen of the device. A user can specify a credential, such as a short code, that is associated with a specific application. If the credential is recognized, the device can be unlocked and the corresponding application displayed. The user can then be granted full or partial access to functionality and/or data of the device, as may depend at least in part upon the type of credential or a level of access specified for the credential. The credential can be based at least in part upon, or independent of, a general unlock credential for the device. In some embodiments, the user can be able to specify the amount and/or type of access to be granted under a credential, such as access only to utilize the corresponding application.

20 Claims, 6 Drawing Sheets

ACCESSING APPLICATIONS FROM SECURED STATES

BACKGROUND

People are increasingly utilizing portable computing devices such as tablet computers and smart phones. In many instances, these devices are able to be "locked," or otherwise placed in a secured state wherein access can only be granted through some presentation of an identifier or credential, such as a personal identification number ("PIN"), password, or pattern. The presentation of such a credential often causes the device to present a "home" screen, or other such interface state, which then enables the user to navigate to a desired application of interest or other such digital object. Such an approach can be undesirable for at least some users, as this process takes multiple steps each time a user wants to access an application. The frustration can be exacerbated when the application is an application that the user frequently accesses, requiring a significant amount of time and energy just for the user to utilize that application as needed.

BRIEF DESCRIPTION OF THE DRAWINGS

Various embodiments in accordance with the present disclosure will be described with reference to the drawings, in which.

DETAILED DESCRIPTION

Approaches in accordance with various embodiments of the present disclosure overcome one or more of the aforementioned and other deficiencies experienced in conventional approaches to providing input and/or gaining access to an electronic device. In particular, approaches discussed herein enable an application or other digital object to be directly accessed from a lock screen, or other secured state, on the device. In a secured state, at least some functionality on the phone can be prevented (or limited) from being accessed by a user unless the user presents some type of credential to gain access to that functionality. The functionality can relate to functions of the device itself, functions associated with an application or operating system, functions associated with files or digital objects, functions associated with third party applications and services, and the like. A credential such as a general unlock password or personal identification number can be used to unlock all functionality on the device, except where other credentials or access mechanisms might be needed for specific functionality or applications, etc. In at least some embodiments, one or more credentials, such as short codes or specific passwords, can be assigned to different applications, with the entry of each of the credentials enabling the corresponding application to be directly accessed from a lock screen without having to enter a general unlock credential and then navigate to, and select, that application. The credentials can be assigned in a number of different ways, such as may be based upon a selection by a user or application, or placement of the application on a screen of an interface on the device. A credential might also be associated with a type or level of access to be granted. For example, a credential that is at least as secure as a general unlock credential might take the user directly to the application, and may also unlock the phone such that all other functionality is available as well. A credential that is not as secure as the unlock credential, or is otherwise associated with a different security level, might instead allow access only to the associated application, or even certain functionality of that application, whereby the general unlock credential or another such credential is to be entered in order to gain access to additional functionality on the device.

Many other alternatives and variations are described and suggested below in relation to at least some of the various embodiments.

Figure 1A:
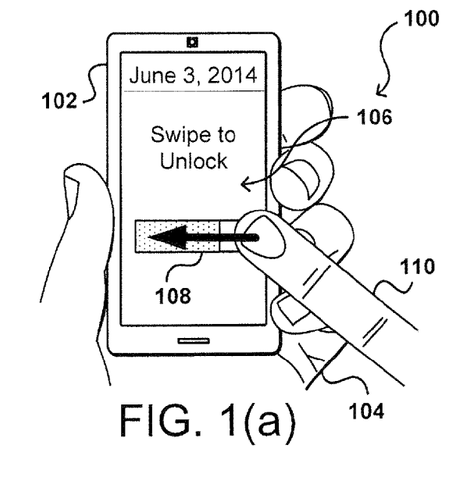
FIGS. 1(a), 1(b), 1(c), 1(d), and 1(e) illustrate an example approach to navigating an interface on a portable computing device.

FIG. 1(a) illustrates an example situation 100 wherein a user is interacting with a graphical user interface (GUI) 106 rendered for display on a display screen of a computing device 102. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, smart televisions, a wearable computer (e.g., a smart watch or glasses), and portable media players, among others. In this example, the user is holding the computing device 104 in one of the user's hands 104. The device is locked, or in a secure state or similar operational mode, such that the user must perform some type of action in order to gain access to at least some of the functionality on the device. In some cases, a simple action is required to access the functionality, which in at least some cases is used to prevent the device from inadvertently accepting input when the device is in a pocket or bag, for example. In this example, the user swipes a certain element 108 on the display in a certain direction to access functionality on the device. In some embodiments some functionality might be available without such an action, with other functions accessible only upon unlocking the device. For example, the device might display certain types of information and allow calls to be received without first being unlocked.

Figure 1B:
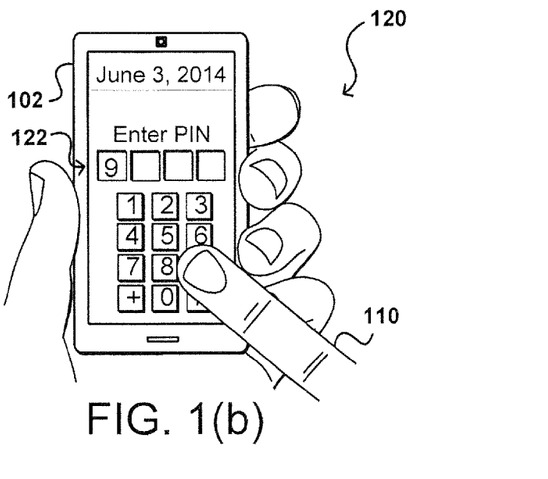

In some cases, a user might also want to prevent other people from accessing at least some of the functionality of the device, as well as information stored on, or available via, the device. Accordingly, as illustrated in the example situation 120 of FIG. 1(b), a user might configure the computing device 102 to accept some type of credential in order to unlock the device. In this example, the user can enter a personal identification number (PIN) or other alphanumerical sequence into an appropriate graphical element 122 or other field or object on the device. In this example the display screen is a touch sensitive screen that enables the user to use a finger 110, stylus, or other such object to enter the credential via contact with the appropriate area(s) of the screen. Other approaches can be used as well, such as through entry with a physical keypad, virtual keyboard, swipe or gesture input, voice input, and the like. The user can be allowed up to a maximum number of attempts to provide a correct credential, after which the device might remain locked for at least a minimum period of time.

Figure 1C:
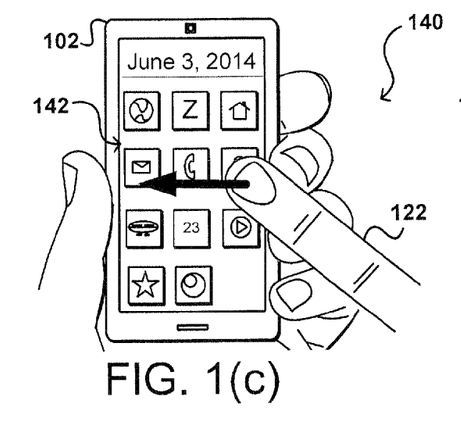
Figure 1D:
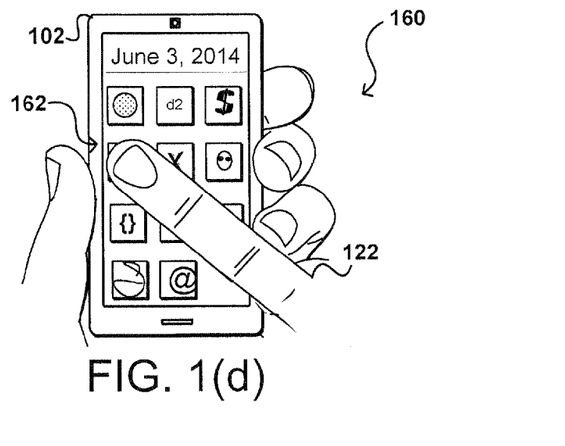
Figure 1E:
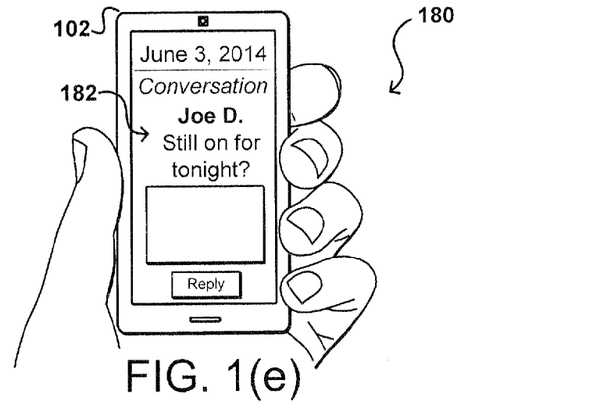

Once the user has provided a correct credential, the device can display a determined interface, such as a home screen 142 or other such portion of content, as illustrated in the example situation 140 of FIG. 1(c). Many interfaces include icons for various applications, files, functions, or other such objects or aspects. Since the device is only able to display up to a determined number of icons while having the icons be of a useful size, the user often has to scroll to other pages or scroll or navigate within a page, where only a portion of that page is displayed at any time. In this example, the user is able to perform a swipe action, or other such motion across the display of the device, which can cause the interface to display a different set of icons 162, such as is illustrated in the example situation 160 of FIG. 1(d). Once the user is able to navigate to a place where an icon for a desired application is displayed, or at least accessible, the user can select that icon 162, such as by pressing on the corresponding location on the screen for at least a minimum period of time, in order to cause the corresponding object to be accessed. As illustrated in the example situation 180 of FIG. 1(e), if the icon is associated with a messaging application then an interface 182 for the application can be displayed in response to the user selecting the corresponding icon.

As can be seen from the above description, however, there are several steps that a user must take yin order to unlock the device, locate the appropriate icon, and then select that icon in order to access the desired functionality or content. If a user frequently accesses that functionality or content from a lock state of the device, this creates a significant amount of additional work on the part of the user. If a user wants to check messages or appointments throughout the day then the user might desire a quicker and/or easier way to go directly to the appropriate application, for example, while still maintaining the security of the device.

Accordingly, approaches in accordance with various embodiments enable the usage of various types of credentials to directly access applications, content, functionality, files, or other such digital objects or aspects from a lock screen or other secured state of a computing device. In at least some embodiments, a user is able to specify an object (e.g., a mobile app) to be accessed from the lock screen, and can specify a credential to be provided to unlock the device and cause the object to be directly accessible. In some embodiments, the credential for that object might have an associated security level, or other such aspect, that determines how much functionality of the device, or data accessible via the device, will be accessible in response to providing that credential.

Figure 2A:
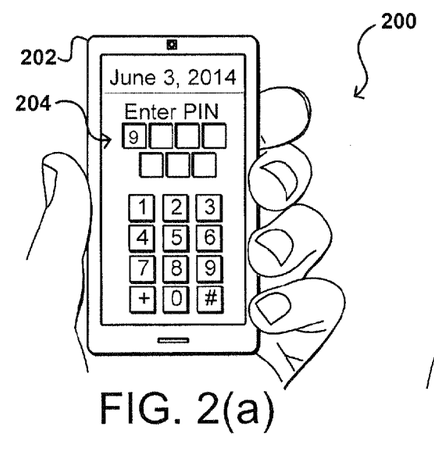
FIGS. 2(a), 2(b), 2(c), and 2(d) illustrate example ways in which a user can access an application from a lock state that can be utilized in accordance with various embodiments.

For example, the example situation 200 of FIG. 2(a) illustrates a field 204 (or set of fields) that enables a user to enter a credential to unlock the computing device 202. In this example, a "general" unlock code, which the user can specify to unlock the device and go to a default or other such page or interface, can be a credential such as a PIN or password, among other such alphanumeric strings. In some embodiments, the user might be able to enter a four digit PIN to unlock the device. The device 202 might also allow for the entering of a longer credential, such as the unlock PIN plus at least one additional alphanumeric character. In the example illustrated, the user can enter the unlock PIN in the top four fields to do a general device unlock. If the user wants to fully unlock the device but go to a specific state of the device, for example, the user can also enter one or more characters to indicate the state to be displayed. For example, the user could enter a "2" to go to an application associated with the short code PIN+2, which goes directly to the application and completely unlocks the device. The user could alternatively enter a "C" to go to a calendar application or an "M" to go to a messaging application, for example, such that the user might enter PIN+"C" to directly access the calendar application or PIN+"M" for the messaging application. In other embodiments, the user might not want to utilize the PIN, such as where the user is allowing another person to access an application on the device, but might instead utilize just a short code in the bottom three fields to enable the person to access that application but not other functionality or data on the device. For example, the user PIN might be 1234, and an application code might be 567. If a user wants to unlock the device the user could enter the credential 1234. If the user wants to unlock the device and go directly to that application, the user could enter 1234567. If, however, the user wants to allow another user, such as a child, to access the specific application (e.g., a game) without unlocking the rest of the device, the user could enter (or provide to the person to enter) just the shortcut code 567, which would not fully unlock the device and would not require the user to provide the PIN to the person, preserving the security of the PIN.

Figure 2B:
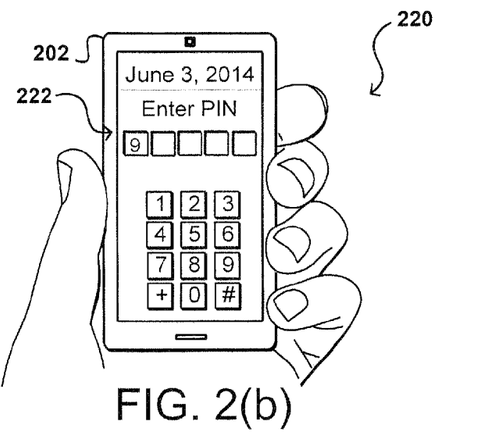

FIG. 2(b) illustrates another example situation 220 wherein a field 222 similarly enables a user to enter credentials of the same or different lengths. It should be understood that a user could use a scheme such as 1-10 as shortcut codes for specified applications, or applications with icons in specific places, along with the appropriate MN in order to unlock the device and go directly to the appropriate application. In other embodiments, the user can utilize credentials that may be unrelated to the PIN, but are at least as secure if functionality on the device is to be unlocked. For example, the unlock PIN might be 1234. If the user wants to fully unlock the device and go directly to the app then user might select credentials such as 12345 or 4321, each of which is at least as secure as the PIN (i.e., has the same length and variation of characters, among other such options). If the user wants to be able to go directly to an application but not unlock other functionality on the device, the user can utilize a less secure credential, such as 123 or 12 or even 1. As the credential gets shorter, however, the likelihood increases that someone can guess the credential and obtain unapproved access, or that an accidental bump can accidentally unlock that app on the device. There can be various other concerns with short credentials as well. In some embodiments, the length or security of the credential can determine the level of access that is granted upon entering of that credential.

Figure 2C:
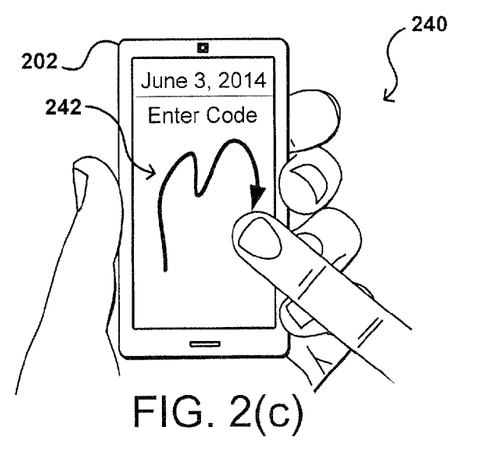

While alphanumeric PINs and passwords have been used for purposes of explanation, it should be understood that other types of credentials can be provided as well within the scope of the various embodiments. For example, FIG. 2(c) illustrates an example situation 240 wherein a user is able to provide a credential by performing a specific motion or gesture with respect to the device, whether in contact with, or a distance from, the computing device. The device is capable of detecting the motion, such as by using a touch screen, capacitive sensor, proximity sensor, or imaging component, for example, and comparing that motion against a set of patterns (or paths, etc.) to attempt to determine whether the motion corresponds to a recognized credential pattern. Similarly, the device can attempt to interpret the motion as input to a virtual keyboard or keypad, among other such options. In the example of FIG. 2(c), the user has performed a specific motion 242 with respect to the device. A process such as pattern matching can look at features such as inflection points, transition points, relative lengths, etc., to attempt to determine whether the motion corresponds to a recognized credential. Various pattern matching algorithms are known for recognizing motions and as such will not be discussed herein in detail. In at least some embodiments the computing device 202 can utilize a specific pattern credential to unlock the device. An application-specific pattern, for example, can utilize one or more additional pattern portions added to the end of the unlock pattern. Other embodiments can enable the user (or another such entity) to specify other patterns, which in at least some embodiments can be required to be at least as complex as the unlock motion, or can be required to have at least a minimum level of complexity, such as may include at least two transition points, in order to at least obtain a certain level of access to functionality and/or data on, or accessible via, the device. Various types of credentials can be used and analyzed as known for security and other such purposes.

Figure 2D:
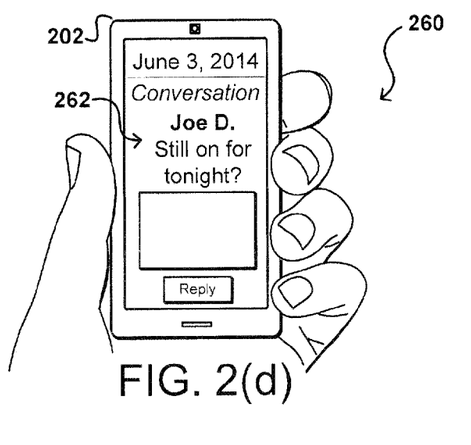

Once a credential is recognized that is associated with a digital object such as an application, for example, the user can be provided with direct access to that digital object. For example, in the situation 260 of FIG. 2(d) the credential is associated with a messaging application. When the corresponding credential is received to the device while in a lock state, the device can provide access to at least a portion of the functionality associated with the credential, and can cause the device upon being unlocked to display an interface 262 of the associated messaging application. If the credential is associated with a file, for example, the device can cause that file to be displayed upon the device being unlocked. Various other types of object can be displayed or provided as well.

In some embodiments, the credential can be associated with a specific state, page, or location in the digital object. For example, if the credential is associated with an email application then the credential might cause the email application to be opened to the inbox, or another specified location. If the credential is associated with a game, the credential might cause the application to open the game to the current save point instead of a splash screen or other such introductory interface. If the credential is associated with a music file, the file can be played from the last accessed point, or other such location. Various other states can be directly accessed as well via the use of the credential.

Figure 3A:
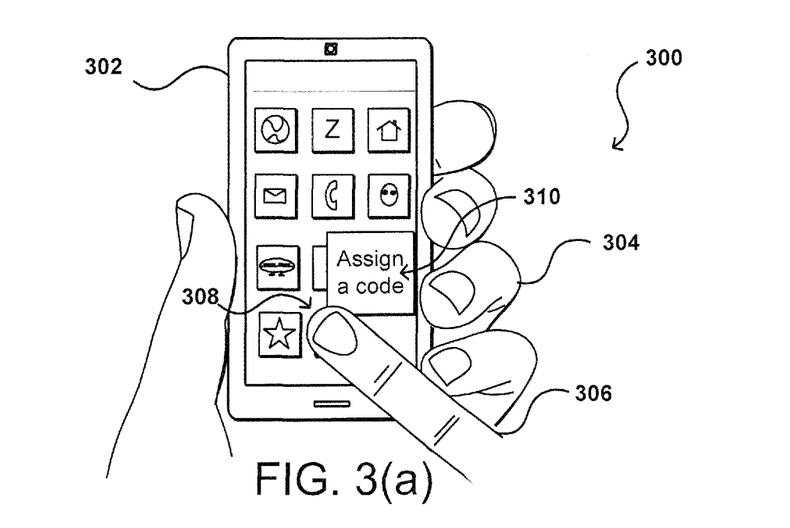
FIGS. 3(a) and 3(b) illustrate example approaches to assigning access codes to various applications that can be utilized in accordance with various embodiments.
Figure 3B:
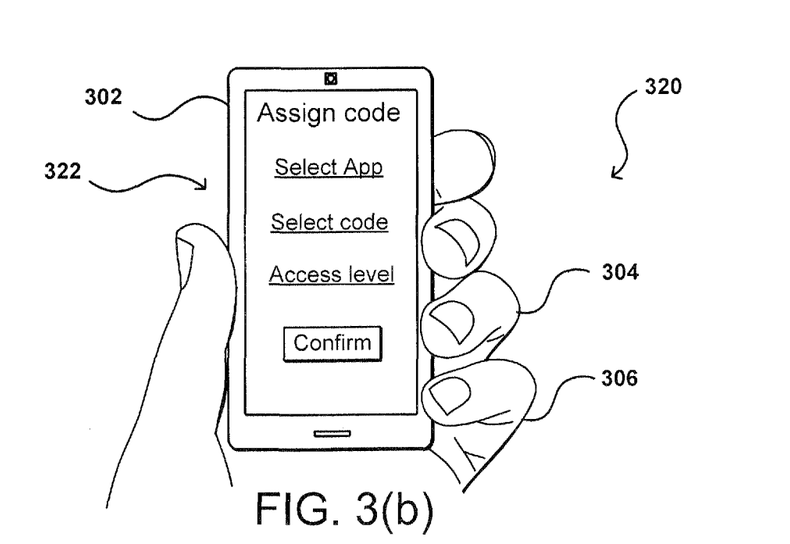

As mentioned, in some embodiments a credential for an application or other digital object might be specified by the device or a provider, or can be based at least in part upon an unlock credential and/or a location of the digital object on an interface of the device. In other embodiments, a user might be able to specify a credential to be used to access an application or other digital object from a lock screen or secure state. For example, FIG. 3(a) illustrates an example situation 300 wherein a user is able to assign a credential to a digital object by selecting that object on a display of a computing device 302. In this example, the user is holding the device in one hand 304 and using a finger 306 of the other hand to press on an area of the display associated with a specific application icon 308. Pressing for less than a threshold amount of time might cause the application to be executed, for example, while pressing for a longer time might bring up a modal window 310 or other such interface element enabling the user to assign a code, or other credential, to that application in order to be able to access that application directly from a lock screen or other such state or location. Similarly, the example situation 320 in FIG. 3(b) allows a user to enter a code or credential specifying interface 322 wherein the user can select applications or other digital objects to which codes or credentials are to be applied, then determine access levels or other criteria or parameter values for each digital object. Various other interfaces or specification methods can be used as well within the scope of the various embodiments.

Figure 4:
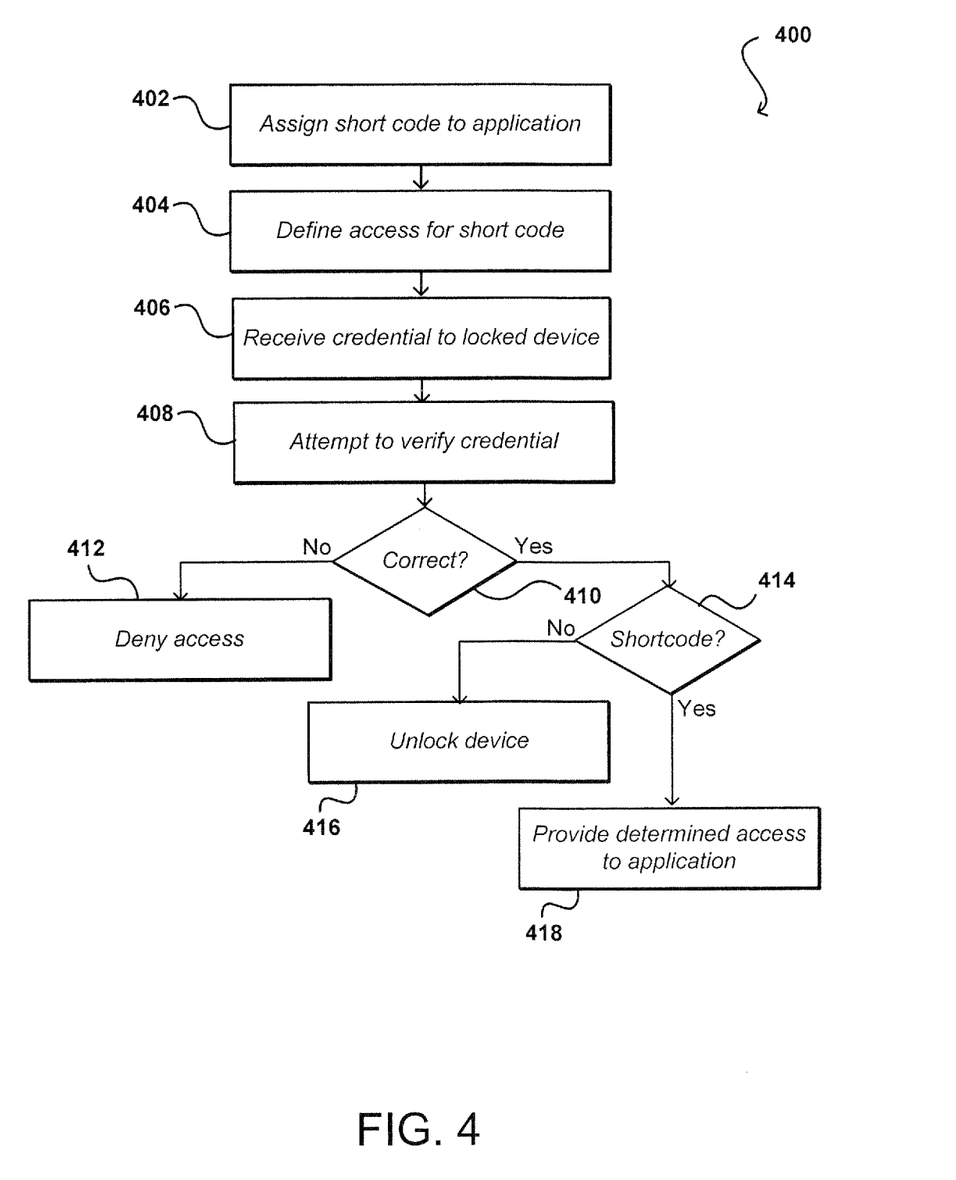
FIG. 4 illustrates an example process for navigating an interface on a computing device that can be utilized in accordance with various embodiments.

FIG. 4 illustrates an example process 400 for enabling a user to directly access an application from a lock screen, or other secured state, that can be utilized in accordance with various embodiments. It should be understood, however, that there can be additional, fewer, or alternative steps performed in similar or alternative orders, or in parallel, within the scope of the various embodiments unless otherwise stated. In this example, a short code, or other such credential, is assigned 402 to an application. As mentioned, the short code can be an alphanumeric string or other such credential, for example, which can be based at least in part on, or independent from, an unlock credential for the device. A level or type of access to be provided for the short code also can be defined 404, either automatically based on the type of code or manually by a user or other such entity. Information for the code, the application, and the security level can be stored on and/or remote to the device.

A code, or other credential, can subsequently be received 406 to the device, such as through manual entry by a user. The device (or a system in communication with the device) can attempt to verify 408 the code, such as by comparing the code against a list or set of approved credentials for the lock state on the device. If the code is not determined 410 to be a correct and/or verifiable code or credential, then access to the device can be denied 412. As discussed, in at least some embodiments the device might accept up to a maximum number of attempts over a determined period of time before no longer accepting and/or processing unlock attempts, at least for a minimum period of time or until another unlock approach is authenticated. If the PIN portion is correct but the application-specific portion in incorrect, the device in some embodiments might simply treat the credential as if the PIN alone had been entered and unlock the device. If the code is determined to be a correct code or credential, another determination can be made 414 as to whether the code is a short code, or a credential associated with an application. If not, and the code is determined to be a general unlock code, the device can be unlocked 416 using a conventional process. If the code is determined to be a short code associated with an application, for example, the application can be determined and access to that application can be provided 418. As discussed, the level or type of access provided within the application, or to functionality and/or data outside the application, can be determined based at least in part upon one or more security settings associated with the credential or application. Various access rules and/or controls can also be utilized with different types of credentials, credentials for different types of digital objects, etc.

Functionality discussed herein can be provided at different level in different ways. For example, the credentials can be managed by an application executing on the device, which can call into the appropriate object to cause that object to be executed, displayed, and/or activated at the desired location or state. In other embodiments, functionality might be provided through the operating system, and an application can utilize a corresponding interface in order to allow the application to take advantage of the functionality. At least some of the functionality or storage can also be provided and/or maintained remotely, such as at a remote server or cloud provider. Various other options can be utilized as well within the scope of the various embodiments.

In some embodiments there might be additional and/or minimum security needed to unlock any functionality on a device, such as may be specified by a security team for a company computing device. Thus, there might be minimum lengths or requirements for unlock credentials, or limits on the types of credentials that can be used. In some embodiments, biometrics (e.g., facial, retina, or fingerprint recognition) might be used with an unlock gesture to obtain access to functionality without providing the approved unlock credential. Various other limitations or requirements can be supported as well within the scope of the various embodiments.

Figure 5:
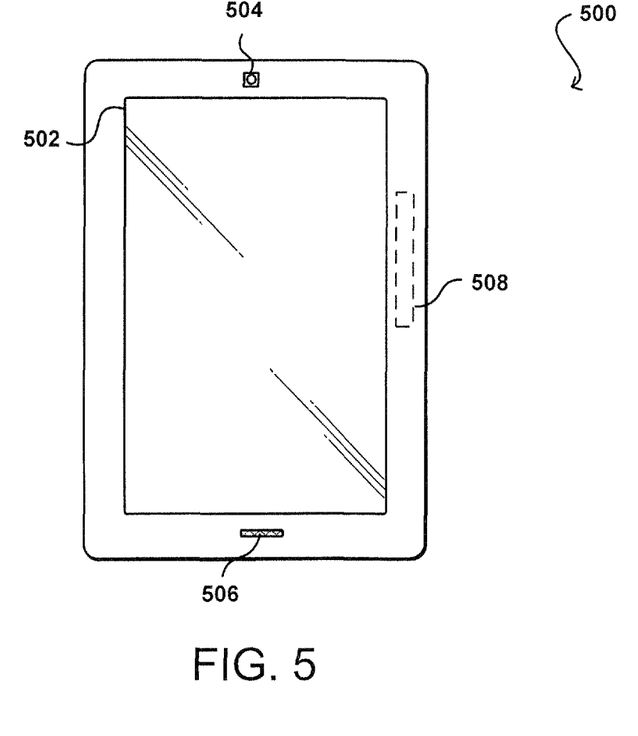
FIG. 5 illustrates an example computing device that can be utilized in accordance with various embodiments.

FIG. 5 illustrates an example electronic user device 500 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 500 has a display screen 502 on the front side, which under normal operation will display information to a user facing the display screen (e.g., on the same side of the computing device as the display screen). The display screen can be a touch sensitive screen that utilizes a capacitive touch-based detection approach, for example, that enables the device to determine the location of an object within a distance of the display screen. The device also includes at least one communication and/or networking component 508 operable to enable the device to communicate, via a wired and/or wireless connection, with another device, either directly or across at least one network, such as a cellular network, the Internet, a local area network (LAN), and the like. Some devices can include multiple discrete components for communicating over various communication channels.

The computing device in this example includes at least one camera 504 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types.

The example computing device 500 also includes at least one microphone 510 or other audio capture device capable of capturing audio data, such as words or commands spoken by a user of the device. In this example, a microphone is placed on the same side of the device as the display screen 502, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

Figure 6:
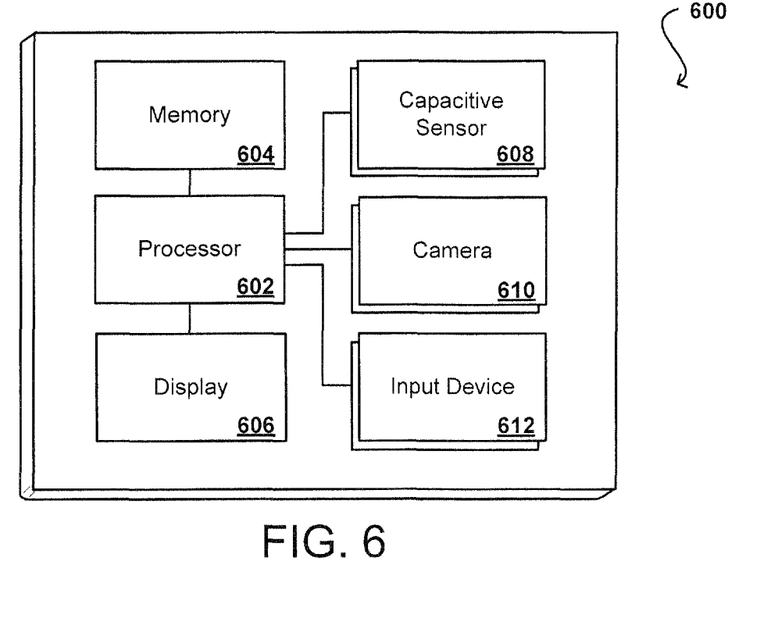
FIG. 6 illustrates an example set of components that can be utilized in a device such as that illustrated in FIG. 5.

FIG. 6 illustrates a logical arrangement of a set of general components of an example computing device 600 such as the device 500 described with respect to FIG. 5. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include one or more cameras or camera sensors 610 for capturing image or video content. Such components can include at least one image capture element such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 600 includes at least one capacitive component 608 or other proximity sensor, which can be part of, or separate from, the display assembly. In at least some embodiments the proximity sensor can take the form of a capacitive touch sensor capable of detecting the proximity of a finger or other such object as discussed herein. The computing device can include one or more communication elements or networking sub-systems, such as a Wi-Fi, Bluetooth, RF, wired, or wireless communication system. The device in many embodiments can communicate with a network, such as the Internet, and may be able to communicate with other such devices. In some embodiments the device can include at least one additional input device 612 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 600 also can include at least one orientation or motion sensor (not shown). Such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 602, whereby the device can perform any of a number of actions described or suggested herein.

Figure 7:
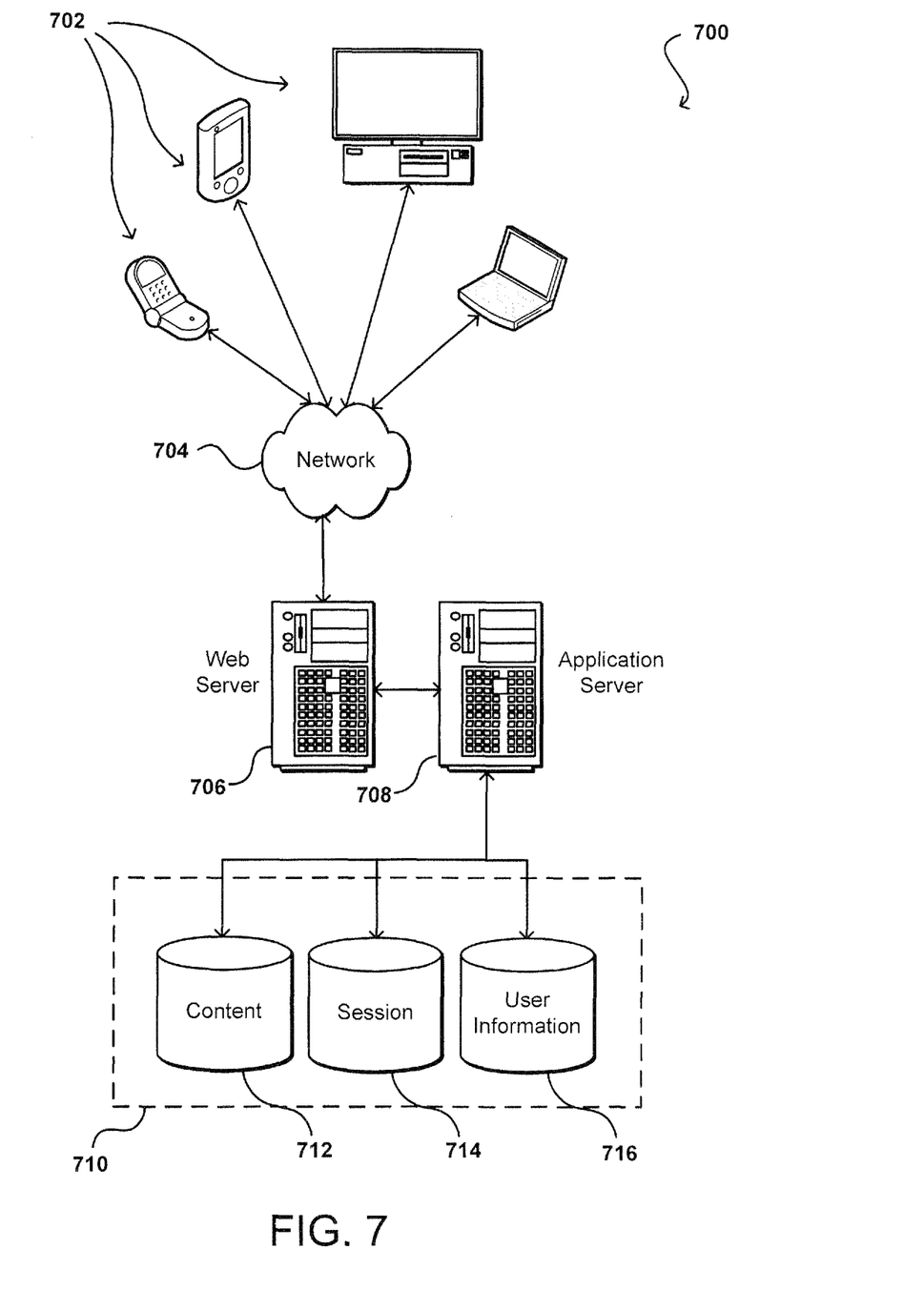
FIG. 7 illustrates an example an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a display screen; and
   a memory device including instructions that, upon being executed by the at least one processor, cause the computing device to:
      display a lock screen;
      obtain an alphanumeric code provided to the computing device, the alphanumeric code including a first portion for unlocking the computing device and a second portion for access to one or more applications stored on the computing device;
      compare the first portion of the alphanumeric code to an unlock code for the computing device;
      unlock the computing device based on the first portion of the alphanumeric code matching the unlock code;
      compare the second portion of the alphanumeric code to an application-specific code associated with an application stored on the computing device; and
      based on the second portion of the alphanumeric code matching the application-specific code:
         provide access to the application associated with the application-specific code; and
         render an interface for the application for the display screen without rendering an intervening interface.

2. The computing device of claim 1, wherein the application includes a plurality of interfaces, and the interface of the application to be displayed is determined at least in part upon the application-specific code.

3. A computer-implemented method, comprising:
   receiving a credential to a computing device, the credential including a first portion for unlocking the computing device and a second portion for access to one or more digital objects stored on the computing device;
   determining that the first portion of the credential matches a security credential for unlocking at least one portion of the computing device;
   unlocking the at least one portion of the computing device;
   determining that the second portion of the credential matches a digital object-specific portion associated with a digital object stored on the computing device; and
   causing an interface for the digital object to be displayed via the computing device without displaying an intervening interface.

4. The computer-implemented method of claim 3, wherein at least a subset of functionality available via the computing remains inaccessible during a period of time the interface for the digital object is displayed.

5. The computer-implemented method of claim 3, wherein unlocking the at least one portion of the computing device includes:
   determining a level of access associated with the first portion of the credential; and
   providing access to at least one portion of functionality available via the computing device based at least in part upon the level of access.

6. The computer-implemented method of claim 5, wherein the level of access specifies that only a subset of the functionality associated with the digital object is to be accessible.

7. The computer-implemented method of claim 3, wherein unlocking at least one portion of the computing device includes:

providing full access to functionality available via the computing device.

8. The computer-implemented method of claim 3, wherein the credential includes at least one of a password, a personal identification number (PIN), an alphanumeric string, a motion, a gesture, or a pattern.

9. The computer-implemented method of claim 3, further comprising:
   receiving a request to specify at least one of the first portion of the security credential or the second portion of the security credential.

10. The computer-implemented method of claim 3, wherein the security credential is based at least in part upon a location of an icon displayed on the computing device that is associated with the digital object.

11. The computer-implemented method of claim 3, wherein the digital object is one of an application, a file, a function, or an icon.

12. A non-transitory computer-readable storage medium storing instructions that, when executed by at least one processor of a computing device, cause the computing device to:
   receive a credential at a computing device, the credential including a first portion for unlocking the computing device and a second portion for access to one or more applications stored on the computing device;
   determine that the first portion of the credential matches a security credential for unlocking at least one portion of the computing device;
   unlock the at least one portion of the computing device;
   determine that the second portion of the credential matches an application-specific portion associated with an application stored on the computing device; and
   cause an interface for the application to be displayed without displaying an intervening interface.

13. The non-transitory computer-readable storage medium of claim 12, wherein the security credential is based at least in part on a location of an icon displayed on the computing device that is associated with the application.

14. The non-transitory computer-readable storage medium of claim 12, wherein the second portion of the credential includes biometric data.

15. The computing device of claim 1, wherein the instructions, upon being executed to cause the computing device to unlock the computing device, include causing the computing device to:
   determine a level of access associated with the first portion of the alphanumeric code; and
   provide access to at least one portion of functionality available via the computing device based at least in part upon the level of access.

16. The computing device of claim 15, wherein the level of access specifies that only a subset of the functionality associated with the application is to be accessible.

17. The computer-implemented method of claim 3, further comprising:
   determining a specific interface of a plurality of interfaces associated with the digital object to be displayed via the computing device based at least in part upon the second portion of the credential.

18. The computer-implemented method of claim 3, wherein the second portion of the credential includes biometric data.

19. The non-transitory computer-readable storage medium of claim 12, wherein the instructions, upon being executed to cause the computing device to unlock the at least one portion of the computing device, include causing the computing device to:
   determine a level of access associated with the first portion of the credential; and
   provide access to at least one portion of functionality available via the computing device based at least in part upon the level of access.

20. The non-transitory computer-readable storage medium of claim 19, wherein the level of access specifies that only a subset of the functionality associated with the application is to be accessible.

* * * * *